United States Patent [19]

Syken

[11] Patent Number: 5,208,992

[45] Date of Patent: * May 11, 1993

[54] MEASURING INSTRUMENT

[76] Inventor: Jeffrey M. Syken, 211-10 73rd Ave. Apt. 4C, Bayside, N.Y. 11364

[*] Notice: The portion of the term of this patent subsequent to Jun. 4, 2008 has been disclaimed.

[21] Appl. No.: 729,651

[22] Filed: Jul. 15, 1991

Related U.S. Application Data

[63] Continuation-in-part of Ser. No. 493,167, Mar. 14, 1990, Pat. No. 5,020,233.

[51] Int. Cl.⁵ .................... B43L 7/10; B43L 7/12
[52] U.S. Cl. ........................ 33/472; 33/465; 33/418; 33/456; 33/499
[58] Field of Search .................. 33/472, 418, 419, 465, 33/452, 478, 492, 495, 496, 497, 499

[56] References Cited

U.S. PATENT DOCUMENTS

| | | |
|---|---|---|
| 909,023 | 1/1909 | Ratner . |
| 1,638,200 | 8/1927 | Hester .................... 33/499 |
| 1,919,551 | 7/1933 | Griffin .................... 33/478 |
| 2,182,027 | 12/1939 | Little ..................... 33/492 |
| 3,343,265 | 9/1967 | Puerta . |
| 4,446,627 | 5/1984 | Persson ................... 33/497 |
| 4,505,044 | 3/1985 | Shafii-Rad-G .............. 33/562 |
| 4,531,302 | 7/1985 | Tighe ..................... 33/492 |
| 4,562,649 | 1/1986 | Ciavarella ................ 33/419 |
| 4,910,876 | 3/1990 | Channell .................. 33/478 |
| 4,920,658 | 5/1990 | Hile ...................... 33/465 |
| 5,020,233 | 6/1991 | Syken ..................... 33/465 |

Primary Examiner—William A. Cuchlinski, Jr.
Assistant Examiner—C. L. Fulton
Attorney, Agent, or Firm—Henderson & Sturm

[57] ABSTRACT

An improved measuring apparatus (10) including male (12) and female (11) measuring instruments equipped with complimentary pairs of male (14) and female (13) sleeve bodies bearing a multiplicity of variably aligned calibrated indicia (50) representative of different drawing scales; wherein, the male (12) and female (11) measuring instruments are adapted to be captively engaged in L and inverted L configurations as well as in an end to end straight line configuration.

8 Claims, 3 Drawing Sheets

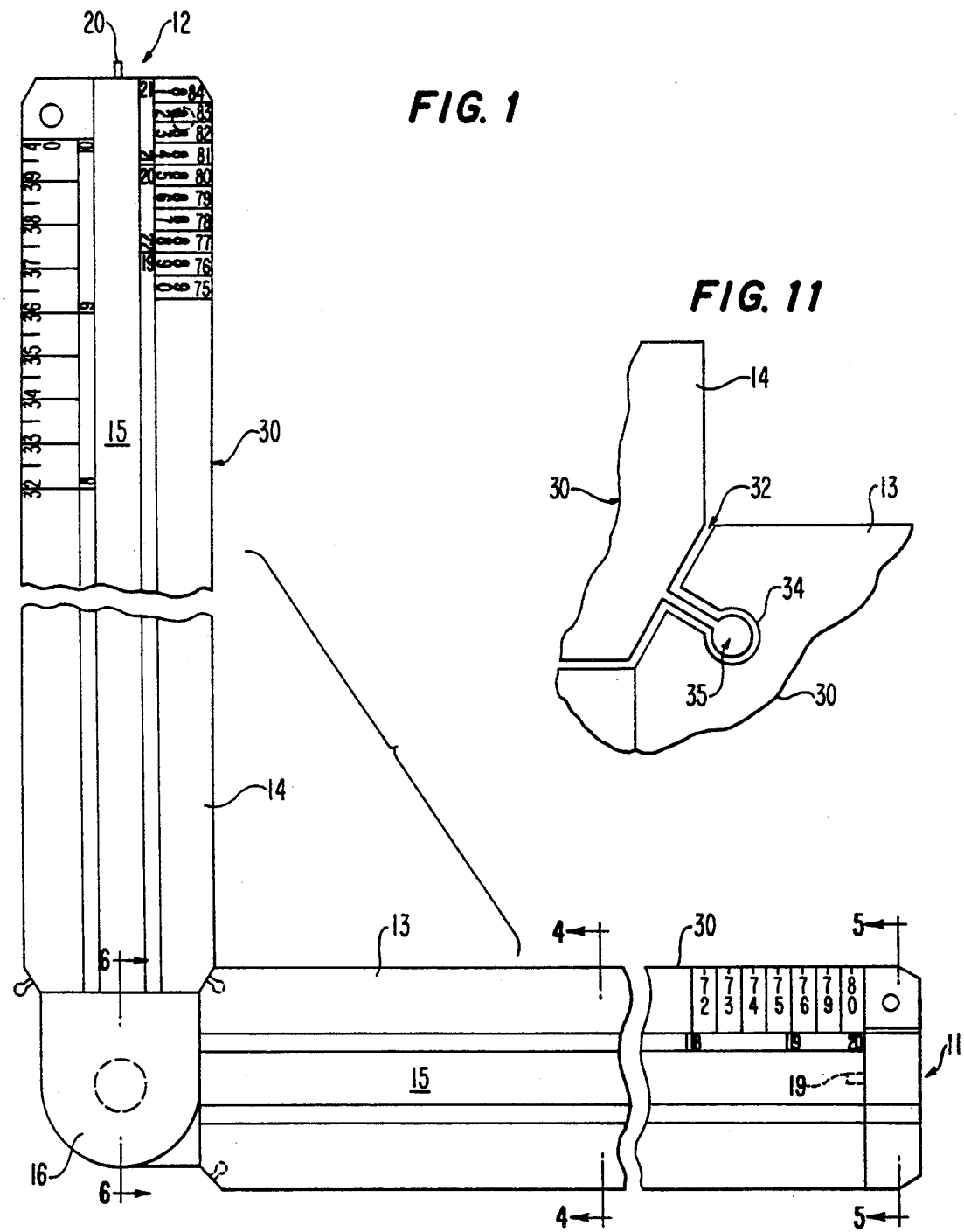

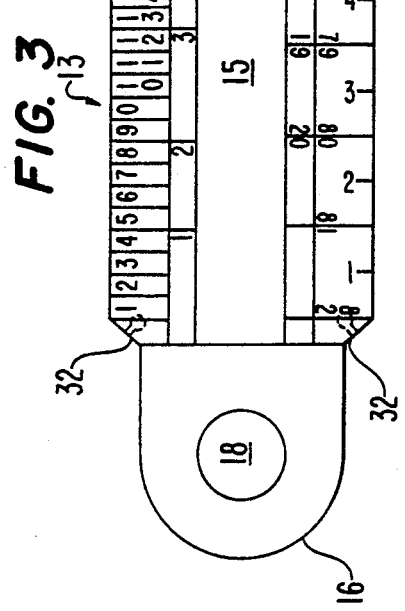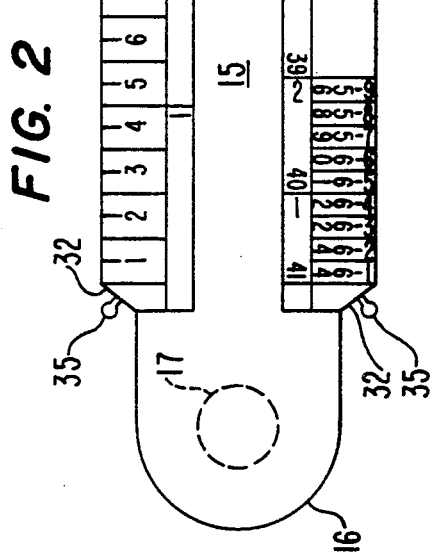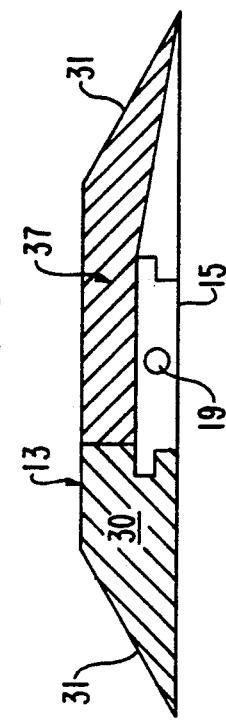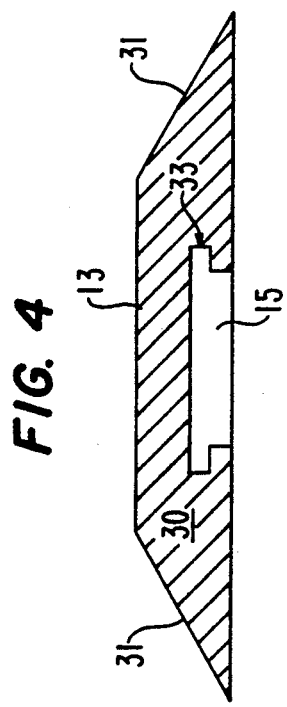

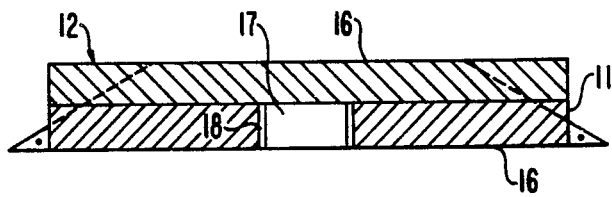
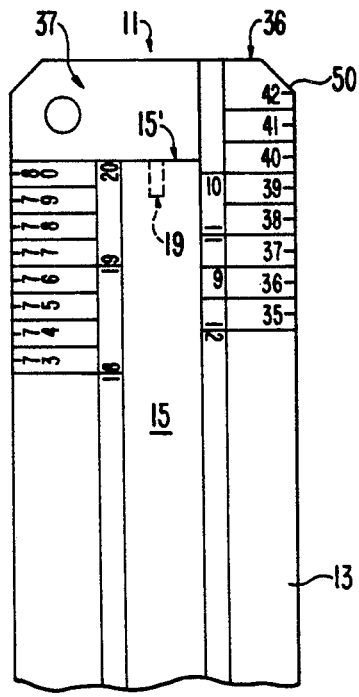
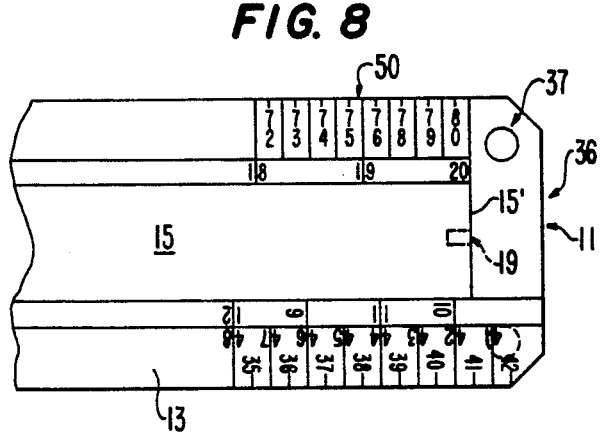
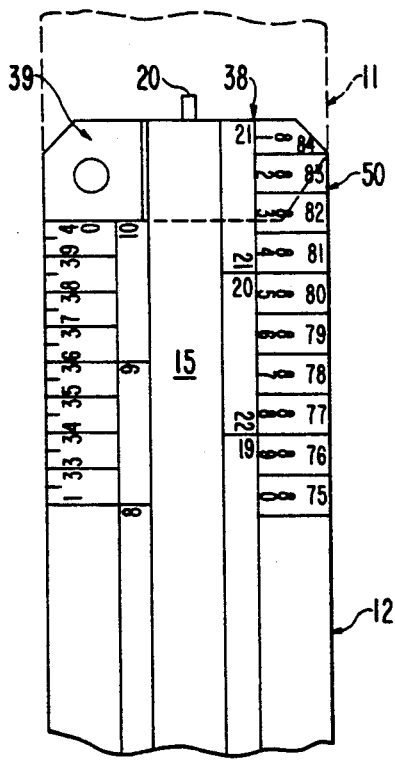
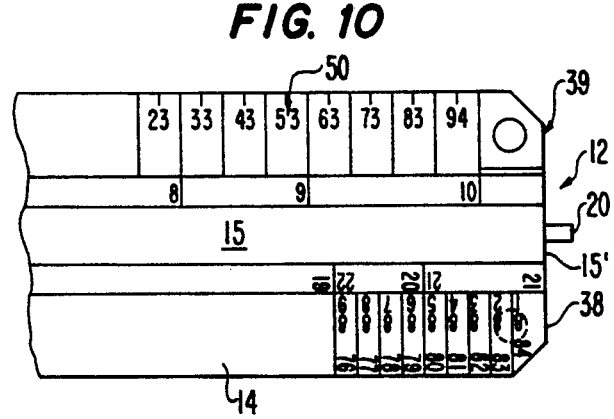

MEASURING INSTRUMENT

This application is a continuation-in-part application of co-pending patent application Ser. No. 07/493,167, now U.S. Pat. No. 5,020,233, which was filed on Mar. 14, 1990 and entitled MEASURING INSTRUMENT.

TECHNICAL FIELD

The present invention relates to the field of measuring instruments in general, and in particular to a multi-mode measuring apparatus having interchangeable scale indicia as well as a multi-position locking capability.

BACKGROUND ART

As can be seen by reference to the following U.S. Pat. Nos. 3,343,265; 909,023; 4,446,627; and 4,562,649; the prior art is replete with myriad and diverse angularly adjustable measuring instruments.

While all of the aforementioned prior art constructions are more than adequate for the basic purpose and function for which they have been specifically designed, these patented arrangements are uniformly deficient not only with regard to the complexity of their locking mechanisms but also with respect to the fact that they did not contemplate the need for removable indicia sleeves to accommodate for situations wherein different scale drawings are to be measured, using the same basic measuring instrument structure.

As a consequence of the foregoing situation, there has existed a longstanding need particularly among those individuals who deal with a variety of different scale drawings for a new type of multi-scale and multi-orientation measuring apparatus to assist them with myriad measuring tasks; and, the provision of such a construction is a stated objective of the present invention.

DISCLOSURE OF THE INVENTION

Briefly stated, the improved measuring apparatus that forms the basis of the present invention comprises a pair of main instrument members which are pivotally and detachably connected to one another; wherein the outboard ends of the pivotally connected main instrument members are provided with male and female portions; such that when the main instrument members are detached from their pivotal orientation relative to one another, the male and female portions can be joined to produce a straight line measuring apparatus.

As will be explained in greater detail further on in the specification, each of the main instrument members are further provided with a pair of sets of indicia sleeve bodies wherein one set of indicia sleeve bodies are provided with a female element and are associated with one of the main instrument members; and, wherein the other set of indicia sleeve bodies are provided with a male element and are associated with the other of the main instrument members.

Furthermore each one of the sleeve bodies within a set is given multiple and reversed indicia different from the other sleeve bodies of that set; yet complimentary with multiple and reversed indicia on one of the sleeve bodies of the other set.

In addition each of the complimentary sleeve bodies in each set of sleeve bodies is provided with a recessed portion and an outwardly projecting portion which are dimensioned to be engaged by the outwardly projecting and recessed portions respectively of their complimentary sleeve bodies such that the indicia are continuous along both edges of the measuring apparatus when the measuring apparatus is in its straight line configuration.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a top plan view of the measuring apparatus of this invention employed in one mode of disposition;

FIG. 2 is an isolated view of one of the sleeve bodies equipped with a pair of male elements;

FIG. 3 is an isolated view of another of the sleeve bodies equipped with a pair of female elements;

FIG. 4 is a cross-sectional view taken through line 4—4 of FIG. 1;

FIG. 5 is an end view taken through line 5—5 of FIG. 1;

FIG. 6 is a cross-sectional view taken through line 6—6 of FIG. 1;

FIGS. 7 and 8 are detail views of the female portions of the main instrument members bearing different sleeve bodies;

FIGS. 9 and 10 are detail views of the male portions of the main instrument members bearing different sleeve bodies; and FIG. 11 is an enlarged cross-sectional detail view of the mating engagement between the male and female elements on the sleeve bodies.

BEST MODE FOR CARRYING OUT THE INVENTION

As can be seen by reference to the drawings, and in particular to FIG. 1, the improved measuring apparatus that forms the basis of the present invention is designated generally by the reference numeral (10). The apparatus (10) comprises a pair of main instrument members (11) and (12) equipped with different sets of complimentary sleeve bodies (13) and (14). These structured components will now be described in seriatim fashion.

As can best be appreciated by reference to FIGS. 1 through 3, 5 and 7 the main instrument members (11) and (12) can be broadly described as a female instrument member (11) and a male instrument member (12) wherein each of the instrument members comprises an elongated generally T shaped stem element (15) which terminated on the inboard end in an enlarged generally flat rounded head element (16) (16'); and wherein the male head element (16) is provided with a downwardly depending post (17) and the female head element (16') is provided with an enlarged central recess (18) that is dimensioned to rotatably receive the post (17); such that the male instrument member (12) is releasably and rotatably received by the female instrument member (11) in a well recognized fashion.

Turning now to FIGS. 5 and 7 through 10 it can be seen that the outboard end of the stem (15) of the female instrument member (11) is provided with a discrete recess (19) and the outboard end of the stem (15) of the male instrument member (12) is provided with a complimentary configured pin (20); whereby the outboard ends of the male (12) and female (11) instrument members may be joined together in a mating fashion to form a straight line measuring instrument as indicated in FIG.

9; when the inboard ends of the instrument members (11) and (12) are disconnected from one another.

As shown in FIGS. 2 through 5 and 11, the sleeve bodies (13) and (14) can likewise be characterized as a female sleeve body (13) and a male sleeve body (14); wherein, each of the sleeve bodies (13) (14) comprise a generally elongated rectangular sleeve body member (30) having leveled sides (31) and inboard ends (32); and wherein the cross-sectional configuration of the sleeve body members (30) define a generally trapezoidal configuration having a generally T-shaped recess (33) formed therein to slideably receive the generally T-shaped cross-sectionally configured stem elements (15) of the male and female instrument members (11) and (12). As can best be seen by reference to FIGS. 2, 3, and 11 the female sleeve body (13) is provided with a pair of contoured recesses (34) disposed on the leveled inboard ends (32) of the female sleeve body (13); and, the male sleeve body (14) is likewise provided with a pair of complimentary contoured snap elements (35) disposed on the beveled inboard ends (32) of the male sleeve body (14) which are alternately received in a selected one of the contoured recesses (34) of the female sleeve body (13); so as to selectively deploy the male (12) and female (11) instrument members in an "L" or an "inverted L" shaped configuration relative to one another.

Turning now to FIGS. 7 through 10 it can plainly be seen that each of the sleeve bodies (13) and (14) are provided with a multiplicity of variably aligned calibrated indicia (50) in both ascending and descending order wherein different scales of indicia may be employed on the same sleeve bodies (13) (14) to render measurements from different scale drawings.

As was mentioned previously the sleeve bodies (13) and (14) are designed to come in complimentary pairs of similar indicia (50); wherein, each of the main instrument members (11) and (12) have their own set of sleeve bodies (13) and (14) bearing the complimentary indicia.

Turning now to FIGS. 5 and 7 through 11 it can be seen that the female sleeve bodies (13) project a substantial distance beyond the outboard ends (15') of the stem element (15) of the female instrument member (11); and the outboard ends (36) of the female sleeve bodies (13) are provided with an enlarged generally rectangular recess (37). Furthermore the outboard ends (38) the male sleeve bodies (14) are disposed generally flush with the outboard end (15') of the male instrument member (12); and, are further provided with a relatively small generally rectangular recess (39); whereby the outboard ends (36) and (38) of the female sleeve bodies (13) and (14) may be brought into a partial overlapping relationship with one another when the male (12) and female (11) measuring instruments are brought into end to end mating engagement with one another.

In addition since the recessed portions (37) and (39) bodies (13) and (14) do not bear indicia (50), the overlapping portions of the sleeve bodies (13)(14) will provide continuous sequential indicia on both of the exposed leveled sides (31) of the measuring apparatus (10).

I claim:

1. An improved measuring apparatus for use with drawings employing different scales; wherein, the measuring apparatus comprises:

generally elongated male and female instrument members having opposite ends wherein one pair of ends are adapted to be releasably and pivotally connected to one another and the other pair of ends are adapted to be releasably and matingly engaged to one another in a straight line fashion; and means associated with said male and female instrument members for captively yet releasably engaging said instrument members in both and L and an inverted L configuration.

2. The apparatus as in claim 1; wherein, calibrated indicia are operatively associated with the opposite sides of said male and female instrument members.

3. The apparatus as in claim 2; wherein, said means comprise:

at least one pair of male and female sleeve bodies adapted to slideably engage said male and female instrument members respectively.

4. The apparatus as in claim 3; wherein, said indicia is imprinted on the opposite edges of said sleeve bodies.

5. The apparatus as in claim 4; wherein, said indicia comprise a multiplicity of variably aligned calibrated indicia.

6. The apparatus as in claim 5; wherein, said means further comprise a plurality of pairs of male and female sleeve bodies bearing a multiplicity of variably aligned calibrated indicia.

7. The apparatus as in claim 3; wherein, said means comprise a pair of contoured recesses formed on opposite sides of one end of said female sleeve body; and, a pair of complimentary contoured snap elements formed on opposite sides of one end of said male sleeve body; wherein, said snap elements are adapted to be releasably and alternately received in said contoured recesses.

8. The apparatus as in claim 6; wherein, said means comprise a pair of contoured recesses formed on opposite sides of one end of each female sleeve body; and, a pair of complimentary contoured snap elements formed on opposite sides of one end of each male sleeve body; wherein, said snap elements are adapted to be releasably and alternately received in said contoured recesses.

* * * * *